United States Patent
Masse et al.

(10) Patent No.: US 8,831,855 B2
(45) Date of Patent: Sep. 9, 2014

(54) METHOD AND A DEVICE FOR MONITORING A SERVO-CONTROL LOOP OF AN ACTUATOR SYSTEM FOR ACTUATING VARIABLE-GEOMETRY COMPONENTS OF A TURBOJET

(75) Inventors: Jean-Remi Andre Masse, Saint Cloud (FR); Christian Aurousseau, Rubelles (FR); Regis Michel Paul Deldalle, Servon (FR); Xavier Flandrois, Cesson (FR); Aziz Sif, Creteil (FR)

(73) Assignee: SNECMA, Paris (FR)

( * ) Notice: Subject to any disclaimer, the term of this patent is extended or adjusted under 35 U.S.C. 154(b) by 360 days.

(21) Appl. No.: 13/278,518

(22) Filed: Oct. 21, 2011

(65) Prior Publication Data
US 2012/0101706 A1 Apr. 26, 2012

(30) Foreign Application Priority Data

Oct. 22, 2010 (FR) ...................................... 10 58681

(51) Int. Cl.
*G06F 19/00* (2011.01)
*G05B 23/02* (2006.01)
*F02C 9/00* (2006.01)

(52) U.S. Cl.
CPC ...................................... *F02C 9/00* (2013.01); *G05B 23/0221* (2013.01)
USPC .............. 701/100; 254/76 R; 60/772; 60/773; 60/782; 60/785

(58) Field of Classification Search
CPC .............................. F02C 9/00; G05B 23/0221
USPC ........ 701/100; 244/76; 60/772, 773, 782, 785
See application file for complete search history.

(56) References Cited

U.S. PATENT DOCUMENTS

| | | | | |
|---|---|---|---|---|
| 5,806,805 | A | * | 9/1998 | Elbert et al. ................... 244/195 |
| 2008/0221835 | A1 | * | 9/2008 | Volponi ....................... 702/185 |

OTHER PUBLICATIONS

U.S. Appl. No. 13/880,815, filed Apr. 22, 2103, Masse, et al.
French Preliminary Search Report issued Jun. 1, 2011, in French 1058681, filed Oct. 22, 2010 (with English Translation of Category of Cited Documents).

* cited by examiner

*Primary Examiner* — John Q Nguyen
*Assistant Examiner* — Jordan S Fei
(74) *Attorney, Agent, or Firm* — Oblon, Spivak, McClelland, Maier & Neustadt, L.L.P.

(57) ABSTRACT

A method for monitoring a servo-control loop (3) of an actuator system (2) for actuating variable-geometry components of a turbojet, said method comprising:
- an estimation step of estimating a plurality of monitoring parameters from operating data of the servo-control loop (2);
- an evaluation step of evaluating a plurality of indicators from the monitoring parameters;
- an evaluation step for evaluating at least one signature matrix, each signature matrix being representative of the values of at least some of the indicators; and
- a detection and location step of detecting and locating a degradation affecting the servo-control loop as a function of said at least one signature matrix.

8 Claims, 2 Drawing Sheets

FIG.3

METHOD AND A DEVICE FOR MONITORING A SERVO-CONTROL LOOP OF AN ACTUATOR SYSTEM FOR ACTUATING VARIABLE-GEOMETRY COMPONENTS OF A TURBOJET

BACKGROUND OF THE INVENTION

The present invention relates to the general field of aviation.

More particularly, it relates to monitoring a servo-control loop of an actuator system for actuating variable-geometry components of a turbojet.

The term "variable-geometry components" is used herein to mean components of equipment other than the rotary members of the engine and that present dimensions, shapes, and/or positions and/or speeds that can be modified as a function of detected events or as a function of engine speeds. Examples of "variable-geometry components" include pitch angles of variable-pitch stator vanes (VSVs) of compressors, variable bleed valves (VBVs) of the compressor, turbine blade tip clearances, and the positions of a fuel metering unit.

In traditional manner, these variable dimensions, shapes, or positions are varied by hydraulic actuator systems that use fuel as their actuating fluid. Such actuator systems are controlled by the electronic control unit (ECU) of the engine, so as to adapt the variable-geometry components to flight conditions. Control is performed via servo-control loops.

Thus, it can readily be understood that it is crucial to monitor the actuator systems of variable-geometry components in order to ensure that a turbojet is available and efficient.

Degradations to such actuator systems lead, in particular, to components of the turbojet taking up positions and/or sizes that do not comply with the controls from the ECU under steady conditions, or to said components responding slowly to such controls under transient conditions. Such degradations are early signs of failure since in general they are initially either compensated by the servo-control loops of the actuator systems or else without any significant consequence other than a reconfiguration (e.g. changing the active control channel).

Nevertheless, after a certain amount of time, when such degradations persist and get worse, they are no longer compensated and they can have the consequence of making a turbojet inoperative or of reducing its performance. That can lead to the ECU issuing a failure message. Such deteriorations are thus detected too late when they are detected only as a result of the actuator system breaking down.

By way of example, document FR 2 939 924 describes a technique of detecting failures in an aeroengine, the technique involving estimating a plurality of indicators.

There thus exists a need to have a method for effectively monitoring the servo-control loops of the actuator systems for actuating variable-geometry components of a turbojet, in particular in order to be able to issue a maintenance notice for such actuator systems before the turbojet is made inoperative or inefficient, while taking care to minimize the number of useless or untimely maintenance operations that are performed.

The document "Hydraulic actuation loop degradation diagnosis and prognosis", by E. Dize-Lledó, J. Aguila-Margin, J-R. Massé, A. Sif, and E. Griful, 1st CEAS European Air and Space conference, 2007, describes the use of diagnosis and prognosis techniques applied to monitoring servo-control loops of systems for actuating variable-pitch stator vanes.

OBJECT AND SUMMARY OF THE INVENTION

The present invention satisfies the above need by proposing a monitoring method for monitoring a servo-control loop of an actuator system for actuating variable-geometry components of a turbojet, said method comprising:
- an estimation step of estimating a plurality of monitoring parameters from operating data of the servo-control loop;
- an evaluation step of evaluating a plurality of indicators from the monitoring parameters;
- an evaluation step for evaluating at least one signature matrix, each signature matrix being representative of the values of at least some of the indicators; and
- a detection and location step of detecting and locating a degradation affecting the servo-control loop as a function of said at least one signature matrix.

Correspondingly, the invention also provides a device for monitoring a servo-control loop of an actuator system for actuating variable-geometry components of a turbojet, said device comprising:
- estimator means for estimating a plurality of monitoring parameters from operating data of the servo-control loop;
- evaluation means for evaluating a plurality of indicators from the monitoring parameters;
- evaluation means for evaluating at least one signature matrix, each signature matrix being representative of the values of at least some of the indicators; and
- detection and location means for detecting and locating a degradation affecting the servo-control loop as a function of said at least one signature matrix.

The invention thus proposes a method and a device for monitoring a servo-control loop of a system for actuating variable-geometry components of a turbojet, which method and device are robust and reliable. By way of example, such an actuator system is a system for actuating variable-geometry components selected from:
- the pitch angles of stator vanes;
- the positions of the discharge valve of a turbojet compressor;
- a fuel flow rate;
- blade tip clearances in a high-pressure or low-pressure turbine.

In the meaning of the invention, it should be observed that a degradation affecting the servo-control loop may refer equally well to any type of fault, degradation, or deterioration affecting said servo-control loop. In the meaning of the invention, degradations are early signs of a breakdown, i.e. if they persist and get worse, they can have the consequence of making the turbojet inoperative or inefficient. As examples, for a servo-control loop of an actuator system controlling variation in the pitch angles of VSVs, such a degradation may comprise:
- an offset of the balance current for a servovalve of the actuator system;
- intermittent contacts (micro-disconnections) present in a position-measuring or control system of the actuator system, possibly leading to drift in the indications provided by such a system;
- blockage of the cooling diaphragm of an actuator of the actuator system;
- internal wear of the actuator cylinder possibly leading to an increase in the internal leakage rate thereof;
- etc.

Advantageously, the invention serves not only to predict breakdowns that might affect the servo-control loop, but also to predict their locations (e.g. in the controller, in the servo-control loop, in the system for acquiring the control as actually applied, etc.), in particular by using symptoms that are representative of the operation of the servo-control loop over a predetermined time period. As a result, a preventative maintenance notice relating to the actuator system may possibly be generated, serving firstly to anticipate a failure of the turbojet and secondly to take action that is relatively narrowly targeted (e.g. in terms of the control system) on the actuator system.

By improving the monitoring of the actuator system, the invention makes it possible to avoid overabundant and useless maintenance of the turbojet while guaranteeing that it is available and efficient. Thus, the availability and the efficiency of the turbojet are increased while reducing maintenance costs and fuel costs.

Preferably, at least one of the parameters is estimated from an autoregressive model depending on at least one exogenous variable selected from:
- air pressure of a combustion chamber of the turbojet;
- metered fuel flow rate through at least one injector of the combustion chamber of the turbojet; and
- speed of rotation of a high-pressure shaft of the turbojet.

Having recourse to an autoregressive model makes it possible to implement predictive monitoring of the actuator system, i.e. not only to diagnose failures of the actuator system, but also to predict how they are going to vary over time and during the lifetime of the turbojet. This characteristic can thus encourage enlightened maintenance of the turbojet, as a function of the severity of any failure.

In addition, the autoregressive model(s) for estimating parameters may be corrected as a function of environmental conditions of the turbojet. Thus, in order to be able to benefit from the advantages of the method of the invention, it is not necessary to ensure that conditions are unchanging in terms of air pressure in the turbojet combustion chamber, fuel flow rate as metered into the injector(s) of the combustion chamber, and/or speed of rotation of the high-pressure shaft of the turbojet.

On the contrary, the invention makes it possible advantageously to adapt the dynamics of the autoregressive model(s) under consideration as a function for example:
- of the fuel flow rate delivered by the fuel pump, which flow rate is a function of the speed of rotation of the high-pressure shaft of the turbojet;
- of air resistance on the linkage, which is a function of the air pressure in the combustion chamber of the turbojet; and/or
- of the flow rate available for the actuator system, which itself is a function of the fuel flow rate metered into the injectors of the combustion chamber of the turbojet.

As a result, the autoregressive models used for estimating the parameters are more precise and it becomes possible to avoid false alarms due to coefficients varying or to the autoregressive models varying as a result of a change in such environmental conditions.

When the actuator system in a particular implementation is an actuator system including at least a servovalve and first and second actuators, it is possible during the estimation step to estimate a plurality of parameters selected from at least one of the following categories:
- a category of parameters representative of positions of the actuators;
- a category of parameters representative of coefficients of autoregressive models used for predicting actuator positions as a function of a control current of the servovalve; and
- a category of parameters representative of the control current of the servovalve or an integral current of the servo-control loop.

The category of parameters representative of positions of the actuators may comprise, for example, at least one of the following parameters:
- a parameter representative of a measured instantaneous position of the first actuator;
- a parameter representative of a measured instantaneous position of the second actuator;
- a parameter representative of a predicted position of the first actuator;
- a parameter representative of a predicted position of the second actuator; and
- a parameter representative of a predicted overall position of the actuator.

Preferably, in this implementation, the plurality of indicators comprises:
- an indicator i_EVS representing the normalized mean square difference between the parameter representative of the predicted overall position of the actuator and an instantaneous overall position of the actuators;
- an indicator i_EVA representing the normalized mean square difference between the parameter representative of a measured instantaneous position of the first actuator and the parameter representative of a predicted position of the first actuator;
- an indicator i_EVB representing the normalized mean square difference between the parameter representative of a measured instantaneous position of the second actuator and the parameter representative of a predicted position of the second actuator;
- an indicator i_CID determined as a function of a parameter representative of the mean control current of the servovalve, as normalized by a parameter representative of a reference control current; and
- an indicator i_CINT determined as a function of a parameter representative of the mean integral current of the servo-control loop, normalized by a parameter representative of a reference integral current.

The above-mentioned indicators contribute to providing monitoring that is reliable and that serves considerably to reduce false alarms relating to detecting degradations and predicting breakdowns. In particular, the above-mentioned indicators make it possible to detect mechanical type degradations of the actuator system reliably, e.g. an offset of the control current of one of the actuators, a blockage of the cooling diaphragm of one of the actuators, internal wear of the cylinder of one of the actuators that might lead to an increase in the internal leakage rate therein.

In an implementation, the positions of the first and second actuators, respectively, are measured by position sensors comprising secondary windings, the root mean square (rms) voltages across the secondary windings depending on the positions of the actuators, with the plurality of indicators comprising:
- an indicator i_EPA representative of a prediction error for the position of the first actuator;
- an indicator i_EPB representative of a prediction error for the position of the second actuator;
- an indicator i_SOMA determined as a function of a parameter representing a mean value of the sum of the rms voltages of the secondary windings of the position sensors of the first actuator, normalized by a parameter representative of a reference mean position for the first actuator;

an indicator i_SOMB determined as a function of a parameter representing a mean value of the sum of the rms voltages of the secondary windings of the position sensors of the second actuator, normalized by a parameter representative of a reference mean position for the second actuator; and an indicator i_EWRAP representative of the mean difference existing between the control current of the servovalve and a measured return control current.

The above-mentioned indicators contribute to providing monitoring that is reliable and they lead to a considerable reduction in false alarms concerning the detection of degradations and the prediction of breakdowns. In particular, the above-mentioned indicators enable electrical type degradations of the actuator system to be detected reliably, e.g. intermittent contacts in the actuator control systems, or intermittent contacts in the actuator measurement systems.

In addition, these indicators make it easier to identify and locate degraded components in the servo-control loop: actuator, servovalve, hydromechanical unit (HMU) containing the servovalve, electric cables (also referred to as harnesses) conveying the control currents or the position indications, etc.

Where necessary, more accurate location can be implemented subsequently in order to identify which component(s) of the control or return systems of the first or second actuators is faulty.

In a particular implementation, the various steps of the monitoring method are determined by computer program instructions.

Consequently, the invention also provides a computer program on a data medium, the program being suitable for being implemented in a monitoring device, or more generally in a computer, the program including instructions adapted to implementing steps of a monitoring method as described above.

The program may use any programming language and may be in the form of source code, object code, or code intermediate between source code and object code, such as in a partially compiled form, or in any other desirable form.

The invention also provides a computer-readable data medium that includes computer program instructions as specified above.

The data medium may be any entity or device capable of storing the program. For example, the medium may comprise storage means, such as a read-only memory (ROM), e.g. a compact disk (CD) ROM, or a microelectronic circuit ROM, or indeed magnetic recording means, e.g. a floppy disk or a hard disk.

Furthermore, the data medium may be a transmissible medium such as an electrical or optical signal, or it may be conveyed via an electrical or optical cable or by radio or by other means. The program of the invention may in particular be downloaded from a network of the Internet type.

Alternatively, the data medium may be an integrated circuit having the program incorporated therein, the circuit being adapted to execute or to be used in the execution of the method in question.

BRIEF DESCRIPTION OF THE DRAWINGS

Other characteristics and advantages of the present invention appear from the following description given with reference to the accompanying drawings that show an implementation having no limiting character. In the figures.

DETAILED DESCRIPTION OF AN IMPLEMENTATION

As described above, the invention relates to monitoring servo-control loops in a system for actuating variable-geometry components of a turbojet fitted to an aircraft.

In the embodiment described herein, attention is given to monitoring a servo-control loop of an actuator system controlling variation in the pitch angles of VSVs of a turbojet.

Nevertheless, this assumption is not limiting in any way. The invention is equally applicable to other systems for actuating variable-geometry components such as, for example, actuator systems controlling:

the positions of bleed valves in a turbojet compressor, such as the systems for actuating VBVs and transient bleed valves (TBVs);

a fuel flow rate, such as systems for actuating a flow modulation valve (FMV); and clearances at the blade tips of a high-pressure or a low-pressure turbine, such as systems for actuating high-pressure turbine active clearance control (HPTACC) or low-pressure turbine active clearance control (LP-TACC).

Figure 1:
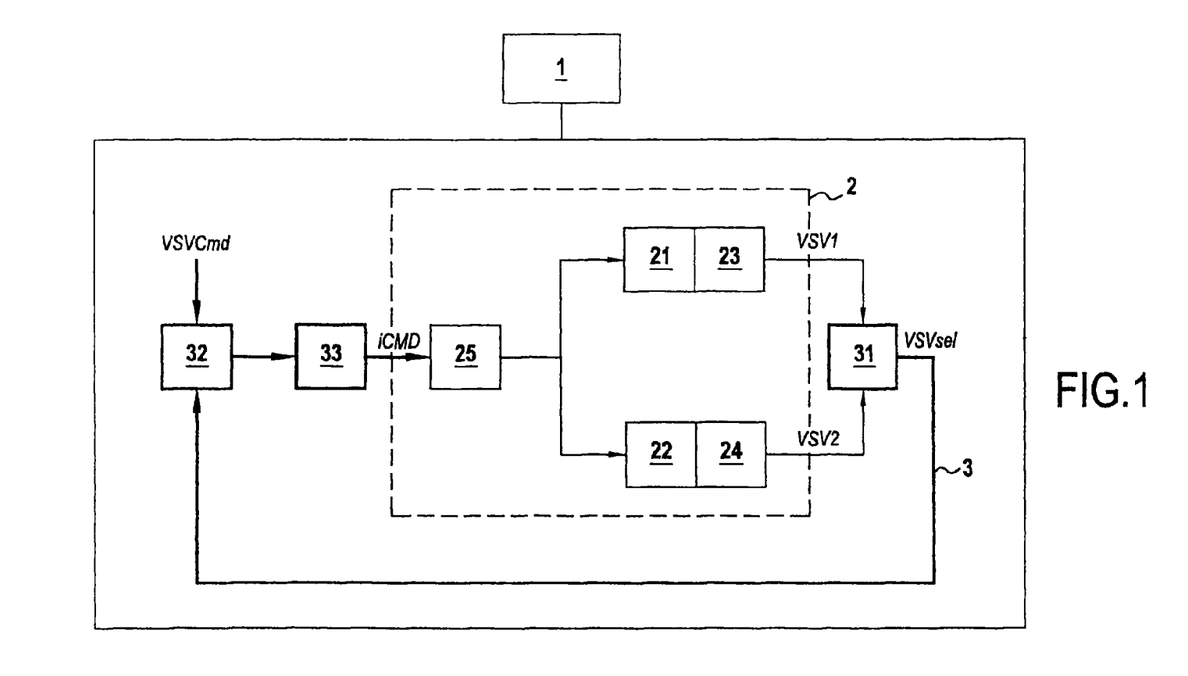
FIG. 1 shows a device for monitoring a servo-control loop in a system of the invention for actuating variable-geometry components in a particular embodiment of the invention.

FIG. 1 shows a particular embodiment of a monitoring device 1 in accordance with the invention in its environment. The monitoring device 1 in this example is adapted to monitor a VSV actuator system 2 in a turbojet on board an aircraft (not shown), the actuator system 2 being controlled by a servo-control loop 3, or "control loop" for short. Such a VSV actuator system or servo-control loop is itself known and is described only briefly herein.

The monitoring device 1 may be the ECU of the turbojet, also referred to as a full authority digital engine control (FADEC) of the aircraft. Under such circumstances, the control loop 3 comprising units 31, 32, and 33 may be implemented by a computer program executed by the monitoring device 1. Thus, in FIG. 1, it should be understood that the units 31, 32, and 33 are functional entities, even if they are shown in parallel with structural elements of the actuator system 2.

In the example described herein, the actuator system 2 has two redundant actuators 21 and 22 that are mechanically secured to each other.

Each actuator is associated with a position sensor (respectively referenced 23 or 24), such as, for example, a linear variable displacement transducer (LVDT) placed in the actuator. In known manner, such an LVDT sensor is constituted:

by a primary winding, powered with alternating current (AC);

by a magnetic slider; and by two secondary windings, referenced EA and EB.

It should be observed that the position of the magnetic slider has an influence on the rms voltages at the terminals of the secondary windings, written Vi_EA and Vi_EB, where i=23 or 24 depending on the sensor under consideration. The position is proportional to the following quantity:

$$\frac{V_{i\_EA} - V_{i\_EB}}{V_{i\_EA} + V_{i\_EB}}$$

The positions of the actuators 21 and 22 are controlled by a servovalve 25, itself controlled by the servo-control loop 3. More precisely, the servovalve 25 adapts the hydraulic power delivered to the actuators 21 and 22 as a function of an electrical control current iCMD that it receives from the servo-control loop 3.

The positions of the actuators 21 and 22 as measured respectively by the sensors 23 and 24 and written VSV1 and VSV2 are delivered to a selector unit 31 of the servo-control loop 3. The selector unit 31 is adapted to estimate an instantaneous overall position VSVsel, that it evaluates on basis of the positions VSV1 and VSV2.

For example, the validities of the positions VSV1 and VSV2 are determined, and VSVsel is equal to the mean of the measured positions VSV1 and VSV2 if they are both valid, or to one or the other of the measured positions VSV1 and VSV2 if only one of the positions is valid. More precisely, VSVsel=VSV1 if VSV1 is valid and VSV2 is invalid, and VSVsel=VSV2 if VSV2 is valid and VSV1 is invalid.

In known manner, the servo-control loop 3 further includes a control unit 32. This control unit 32 is adapted to compare the instantaneous overall position VSVsel as delivered by the selection unit 31 with a so-called "control" position VSVCmd representative of a position in which the actuators ought to be found in compliance with the turbojet regulation relationships implemented by the ECU via the servo-control loop 3 (VSVCmd is an actuator position that is taken into account for determining control of the servo-control loop 3 in the meaning of the invention).

A digital signal representing the position difference between VSVsel and VSVCmd is then transmitted by the control unit 32 to a regulator unit 33 for regulating the servo-control loop 3, which regulator unit is of the proportional integral (PI) corrector type. In known manner, the regulator unit 33 is adapted to transform the digital comparison signal it receives into an electric control current iCMD and to transmit said current to the servovalve 25.

The servovalve 25 then controls the position of the actuators 21 and 22 by transforming the electric control current into hydraulic power, as described above.

In the example described herein, consideration is given to an actuator device made up of a servovalve and two actuators each fitted with a position sensor. Nevertheless, this assumption is not limiting. The invention applies equally to other actuator device structures, such as for example: an actuator system made up of a servovalve, an actuator, and two position sensors, or for an FMV actuator system controlling fuel flow instead of an actuator, etc.

In a variant embodiment, the monitoring device 1 is on board an aircraft, in a data concentrator, which takes charge of the maintenance algorithms of the aircraft.

In another variant embodiment, the monitoring device 1 is included in a system on the ground.

Figure 2:
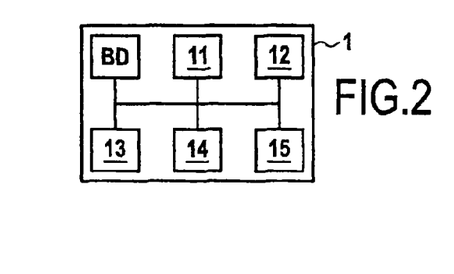
FIG. 2 is a diagram showing the hardware architecture of the FIG. 1 monitoring device, in a particular embodiment of the invention.

The monitoring device 1 in this example has the hardware architecture of a computer, as shown in FIG. 2.

It comprises in particular a processor 11, a random access memory (RAM) 12, a ROM 13, and means 14 for communicating with equipment on board the aircraft, such as for example, with the FADEC of the aircraft or with the components of the actuator system 2 and the servo-control loop 3. In known manner, such pieces of equipment and the monitoring device 1 of the invention communicate with one another via digital data buses or lines that are fitted to the aircraft and known to the person skilled in the art.

The monitoring device 1 also includes communications means 15 for communicating with a server of the aircraft operator (not shown). By way of example, these means comprise a network card for communicating over the Internet.

Figure 3:
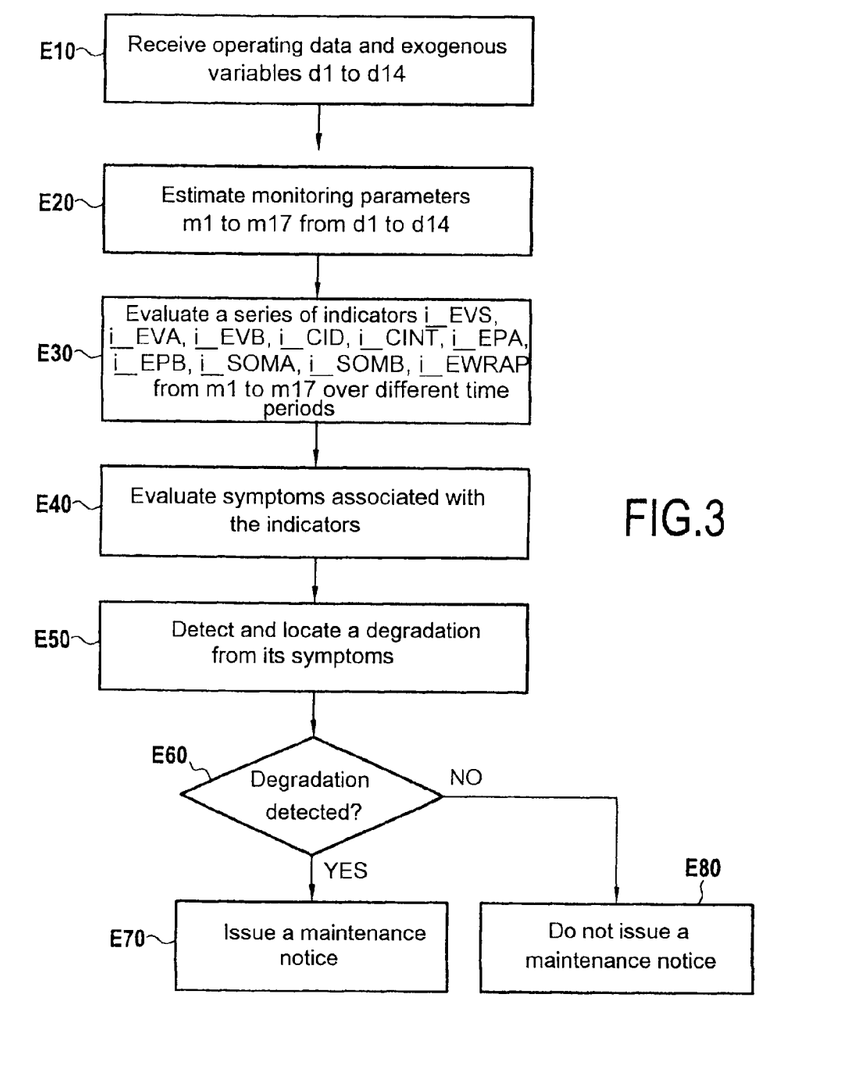
FIG. 3 is a flow chart showing the main steps of a monitoring method in accordance with the invention when implemented by the monitoring device of FIG. 1.

The ROM 13 includes a computer program in accordance with the invention adapted to execute the main steps of the monitoring method of the invention, shown in the form of a flow chart in FIG. 3 as described below.

In accordance with the invention, monitoring of the servo-control loop 3 of the VSV actuator system 2 is implemented via various data sets, including operating data of the servo-control loop, monitoring parameters, indicators, and symptoms. With reference to FIG. 3, there follows a description of these data sets and the way in which they are used relative to one another in order to monitor the servo-control loop 3.

The term "operating data" when applied to the servo-control loop covers various kinds of data needed for the operation of the VSV actuator system, and more particularly the servo-control loop, and/or representative of its operation.

In the example described herein, consideration is given to the following operating data:
- the active channel control current iCMD delivered to the servovalve 25 by the regulator unit 33 (written below d4);
- the measured position VSV1 of the first actuator 21 (written below d5);
- the measured position VSV2 of the second actuator 22 (written below d6);
- the instantaneous overall position VSVsel of the actuators, as delivered by the selector unit 31 (written below d7);
- the difference ε between the control position VSVCmd and the overall position VSVsel (written below d8);
- the sum of the rms voltages (V23_EA and V23_EB) across the secondary windings of the sensor LVDT 23 of the first actuator (written below d9);
- the sum of the rms voltages (V24_EA and V24_EB) across the secondary windings of the sensor LVDT 24 of the second actuator (written below d10);
- the return current (or "warp") as actually measured by the channel A of the ECU (written below d11);
- the return current (or "warp") as actually measured by the channel B of the ECU (written below d12);
- an active channel index IVA (written below d13); and
- the integral current of the servo-control loop (written below d14), as calculated by the regulator unit 33. It should be observed that the integral current serves to correct imperfections of the servo-control loop 3. Making use of the integral current in a servo-control loop, in addition to the proportional current, is known to the person skilled in the art and is not described further herein.

This operating data is available from the FADEC which has the monitoring device 1 incorporated therein, as mentioned above. It may be derived from measurements taken using sensors fitted to the turbojet and themselves known, such as for example the data d5 and d6, or accessible via the ECU, such as for example d7, d13, or d14.

In the example described here, consideration is also given to so-called "exogenous" data selected from:
- the air pressure PS3 in the combustion chamber of the turbojet (written below d3);
- the fuel flow WFM metered out into at least one injector of the combustion chamber of the turbojet (written below d2); and the speed of rotation N2 of the high-pressure shaft of the turbojet (written below d1).

These variables are not inherent to the actuator system and to its servo-control loop properly speaking, which is why they are referred to as being "exogenous", however they have an influence on their behaviors. For example, the speed of rotation of the pump that pumps the fuel that serves as the hydraulic fluid for actuating the actuators is proportional to the speed of rotation N2 of the high-pressure shaft of the turbojet. Similarly, the fuel flow rate WFM as metered out into the injectors of the turbojet combustion chamber has an influence on the flow rate that is available for the hydraulic actuator system. Finally, the air pressure PS3 in the turbojet combustion chamber has an influence on the stress applied to the system by the linkage actuated by the actuators.

These exogenous variables are known to the person skilled in the art and are conventionally measured in the turbojet by means of suitable sensors (e.g. flow meter for WFM). Like the operating data, measurements of these exogenous variables are available to the FADEC.

The above-mentioned operating data and the measurements of the exogenous variables are transmitted by the FADEC to the monitoring device 1 for estimating the monitoring parameters of the servo-control loop 3 (step E10).

It should be observed that this data may be transmitted to the monitoring device progressively as it is acquired, or in a variant after a predetermined time period (e.g. when the turbojet is stopped, or periodically while it is in operation).

In the embodiment described herein, consideration is given to monitoring the servo-control loop 3 by means of a plurality of parameters selected from at least one of the following parameter categories:

a category CAT1 of parameters representative of a position of the actuators 21 and 22.

a category CAT2 of parameters representative of coefficients of autoregressive models used for predicting an actuator position in operation as a function of the control current iCMD of the servovalve 25; and a category CAT3 of parameters representative of the servovalve control current iCMD or the integral current of the servo-control loop 3.

More precisely, in the example described herein, all of the following parameters are estimated over one or more (K) predetermined time periods written TP1, TP2, ..., TPK (step E20):

In the category CAT1:

a parameter written m1, representative of the measured instantaneous position VSV1 of the actuator 21 (first actuator in the meaning of the invention), over the time period TPk under consideration (k=1, ..., K). This parameter is obtained directly from the data d5. In other words, the components of the vector m1 are equal to the data d5 over the time period TPk;

a parameter written m2, representative of the measured instantaneous position VSV2 of the actuator 22 (second actuator in the meaning of the invention), over the time period TPk under consideration (k=1, ..., K). This parameter is obtained directly from the data d6. In other words, the components of the vector m2 are equal to the data d6 over the time period TPk;

a parameter written m3, representative of a prediction of the position VSVsel, over the time period TPk and as made with the help of a first autoregressive prediction model written ARX1. The autoregressive model ARX1 under consideration is described below;

a parameter written m8, representative of a so-called "reference" mean value for the sum of the rms voltages (VA23_EA and V23_EB) across the secondary windings of the actuator 21 over a predefined reference or training time period written TP0. The parameter m8 is obtained by evaluating the mean over said reference period of type d9 reference data derived from measurements performed on a plurality of turbojets of the same type or belonging to the same fleet as the turbojet fitted with the actuator system 2;

a parameter written m9, representative of a mean value of the sum of the rms voltages (VA23_EA and V23_EB) of the secondary windings of the actuator 21 over the time period TPk under consideration. The parameter m9 is obtained by evaluating the mean of the data d9 over the time period TPk;

a parameter written m10, representative of a so-called "reference" mean value of the sum of the rms voltages (VA24_EA and V24_EB) across the secondary windings of the actuator 22 over the reference or training time period TP0. The parameter m10 is obtained by evaluating the mean over this time period of the reference data of type d10 as derived from measurements performed on a plurality of turbojets of the same type as or belonging to the same fleet as the turbojet fitted with the actuator system 2; and a parameter written m11, representative of a mean value of the sum of the rms values (VA24_EA and V24_EB) across the secondary windings of the actuator 22 over the time period TPk under consideration. The parameter m11 is obtained by evaluating the mean of the data d10 over said time period TPk.

In the category CAT2:

a parameter written m4, representative of the coefficients of the above-mentioned first autoregressive model ARX1 used for predicting a position VSVsel (parameter m3). The parameter m4 is evaluated over a reference observation window W0 of size N, on the basis of reference data of type d7 derived from measurements performed on a plurality of turbojets of the same type as or belonging to the same fleet as the turbojet fitted with the actuator system 2;

a parameter written m5, representative of an overall position of the actuators 21 and 22 as predicted by a second autoregressive model, written ARX2, as a function of the control current iCMD of the servovalve 25;

a parameter written m6, representative of the position of the actuator 21 as predicted by a third autoregressive model, written ARX3, as a function of the control current iCMD of the servovalve 25; and a parameter written m7, representative of the position of the actuator 22 as predicted by a fourth autoregressive model, written ARX4, as a function of the control current iCMD of the servovalve 25.

The autoregressive models ARX1-ARX4 and the way in which coefficients are obtained from these models are described in detail below. It should be observed that the parameters in the category CAT2 in this example are vectors of sizes determined by the numbers of coefficients taken into consideration in the models ARX1-ARX4.

In the category CAT3:

a parameter written m12, representative of the mean difference that exists between the control current iCMD of the servovalve 25 and the return current as actually measured for the channel A of the ECU if said channel is active. The parameter m12 is equal to the mean over the time period TPk of the data (d4-d11);

a parameter written m13, representative of the mean difference that exists between the control current iCMD of the servovalve 25 and the return current as actually measured for the channel B of the ECU if said channel is active. The parameter m13 is equal to the mean over the time period TPk of the data (d4-d12);

a parameter written m14, representative of a mean reference control current. The parameter m14 is evaluated over the reference period TP0 from the type d4 reference data derived from measurements performed on a plurality of turbojets of the same type as or belonging to the same fleet as the turbojet fitted with the actuator system 2;

a parameter written m15, representative of the mean control current of the servovalve 25. The parameter m15 is equal to the mean over the time period TPk of the data d4;

a parameter written m16, representative of a mean reference integral current of the servo-control loop 3. The parameter m16 is evaluated over the reference period TP0 on the basis of type d14 reference data derived from measurements on a plurality of turbojets of the same type as or belonging to the same fleet as the turbojet fitted with the actuator system 2; and a parameter written m17, representative of the mean integral current of the servo-control loop 3. The parameter m17 is equal to the mean over the time period TPk of the data d14.

It should be observed that the above-mentioned parameters are original parameters involved in monitoring the servo-control loop 3. They are preferably all taken into consideration. Nevertheless, in a variant, it is possible to take only a subset of these parameters into consideration, in application of a compromise that needs to be evaluated between performance and complexity.

These monitoring parameters are estimated from the operating data d4 to d14 and from the exogenous variables d1 to d3, as sampled over the time periods TPk (k=1, . . . , K) under consideration.

Preferably, a time period TPk is selected during steady conditions while cruising or while idling on the ground. The inventors have observed that during such steady conditions, the symptoms are the most marked, thereby improving detection of degradations affecting the servo-control loop, and ensuring that detection is more reliable.

There follows a brief description of the autoregressive models used for estimating the parameters m4-m7. It is assumed here that use is made of linear models of the autoregressive model with external inputs (ARX) type, as are well known to the person skilled in the art. In a variant, other autoregressive models could be used, such as for example, models of the autoregressive moving average with exogenous variables (ARMAX) type.

In known manner, an ARX model is an autoregressive model defining an output y(t) as a function of one or more inputs and a random modeling residue characterized by zero average white noise η(t), where $\underline{t}$ designates the sampling instant under consideration.

Advantageously, in the example described herein, the ARX models ARX1-ARX4 have as their inputs the variable d4 representative of the control current iCMD for the servovalve 25 and the exogenous variables d1 to d3 (or in equivalent manner, N2, WFM, and PS3).

Thus, in more precise manner:

the models ARX1 and ARX2 under consideration have the form:

$$y(t) = d7(t) = \sum_{j=1}^{jd7} a_j d7(t-j) + \sum_{j=1}^{jd1} b_j d1(t-j) +$$
$$\sum_{j=1}^{jd2} c_j d2(t-j) + \sum_{j=1}^{jd3} e_{ji} d3(t-j) + \sum_{j=1}^{jd4} f_j d4(t-j) + \eta(t)$$

the model ARX4 has the form:

$$y(t) = d6(t) = \sum_{j=1}^{jd6} a_j d6(t-j) + \sum_{j=1}^{jd1} b_j d1(t-j) +$$
$$\sum_{j=1}^{jd2} c_j d2(t-j) + \sum_{j=1}^{jd3} e_{ji} d3(t-j) + \sum_{j=1}^{jd4} f_j d4(t-j) + \eta(t)$$

the model ARX3 has the form:

$$y(t) = d5(t) = \sum_{j=1}^{jd5} a_j d5(t-j) + \sum_{j=1}^{jd1} b_j d1(t-j) +$$
$$\sum_{j=1}^{jd2} c_j d2(t-j) + \sum_{j=1}^{jd3} e_{ji} d3(t-j) + \sum_{j=1}^{jd4} f_j d4(t-j) + \eta(t)$$

where the elements $a_j$, $b_j$, $c_j$, $e_j$, and $f_j$ designate the coefficients of the ARX models (it should be observed that these coefficients are not necessarily identical for the various models, however for reasons of simplification, only one notation is used). The quantities jd1, jd2, jd3, jd4, jd5, jd6, and jd7 designate the numbers of coefficients for each input and output of the ARX models.

In general, if y(t) designates the output from an ARX model (selected from ARX1-ARX4), and if θ is the vector of size J of the coefficients of the ARX model (J=jd1+jd2+jd3+jd5+jd6), e.g. for y(t)d6(t)), the vector θ may be estimated using conventional methods known to the person skilled in the art over an estimation time window of predefined size N.

Thus, if h(t) designates the vector of size J comprising the observations of the input variables of the ARX model under consideration as various instants (earlier than or equal to $\underline{t}$), and possibly observations of $\underline{y}$ at instants earlier than $\underline{t}$, then it is possible to write:

$$y(t) = h(t)\theta + \eta(t)$$
$$y(t-1) = h(t-1)\theta + \eta(t-1)$$
$$\ldots$$
$$y(t-T+1) = h(t-T+1)\theta + \eta(t-T+1)$$

which is equivalent in matrix form to searching for □ such that:

$$Y(t) = H(t)\theta + N(t) \quad (1)$$

with:

$$Y(t) = \begin{pmatrix} y(t) \\ y(t-1) \\ \vdots \\ y(t-T+1) \end{pmatrix}$$

$$H(t) = \begin{pmatrix} h(t) \\ h(t-1) \\ \vdots \\ h(t-T+1) \end{pmatrix}$$

$$N(t) = \begin{pmatrix} \eta(t) \\ \eta(t-1) \\ \vdots \\ \eta(t-T+1) \end{pmatrix}$$

Solving equation (1) serves to obtain an estimate of the vector θ. This estimate defined:

in the above-mentioned reference estimation window W0,
the parameter m4 when the ARX model under consideration in equation (1) is the model ARX1; this estimate also makes it possible to evaluate the parameter m3 by using equation (1); and in the above-mentioned estimation window W:
the parameter m5 when the ARX model under consideration in equation (1) is the model ARX2;
the parameter m6 when the ARX model under consideration in equation (1) is the model ARX3; and
the parameter m7 when the ARX model under consideration in equation (1) is the model ARX4.

The set of parameters m1 to m17 estimated in this way during step E20 is then used to evaluate a series of indicators (step E30) over each time period TPk under consideration.

More precisely, in the example described herein, ten indicators are evaluated from the parameters m1 to m17 over the time periods TP1, . . . ,TPK. These ten indicators are as follows:

The indicator i-EVS represents the normalized mean square difference between m5 and d7.

More precisely, the sum S_EVS of the differences $(m5-d7)^2$ is calculated for each time period TP1, . . . ,TPK. Thereafter, the indicator i_EVS is calculated by normalizing the sum S_EVS by having recourse to a statistical distribution to which it is subjected, having a reference mean m0 and a reference standard deviation σ0: i_EVS=(S_EVS−m0)/σ0.

The above-mentioned statistical distribution may for example be determined during a calibration stage by observing the sum S_EVS over a predefined training time period. The inventors have found that this distribution presents a normal relationship, thus enabling the above-mentioned normalization to be performed. The other indicators described below are normalized in corresponding manner.

In similar manner, the indicator i_EVA represents the normalized mean square difference between the parameters m1 and m6, the indicator i_EVB represents the normalized mean square difference between the parameters m2 and m7. The indicator i_CID represents the parameter m15 normalized by the parameter m14.

The indicator i_CINT represents the parameter m17 normalized by the parameter m16.

The indicator i_EPA represents the error in the prediction of the position of the actuator 21. It is given by the difference between the measured position, as represented by the parameter m1, and the position m3 as predicted by the model having its coefficients given by the parameter m4.

The indicator i_EPB represents the error in the prediction of the position of the actuator 22. It is given by the difference between the measured position as represented by the parameter m2 and the position m3 as predicted by the model having its coefficients given by the parameter m4.

The indicator i_SOMA represents the parameter m9 normalized by the parameter m8.

The indicator i_SOMB represents the parameter m11 normalized by the parameter m10.

The indicator i_EWRAP is equal to the parameter m12 or to the parameter m13, depending on which channel is active (given by d13).

The set of indicators i_EVS, i_EVA, i_EVB, i_CID, and i_CINT serve to detect mechanical type degradations of the actuator system 2, e.g. an offset of the control current for the actuator 21 or 22, a blockage of the cooling diaphragm of the actuator 21 or 22, internal wear in the cylinder of the actuator 21 or 22 possibly giving rise to an increase in the internal leakage rate thereof.

More precisely, the values of the indicators i_EVS, i_EVA, i_EVB, i_CID, and i_CINT form a matrix, also referred to as a signature matrix, enabling degradation to be detected and located. Several techniques are known to the person skilled in the art for enabling a signature matrix to be associated with a particular degradation. For example, the technique described in document FR 2 939 924 may be used, and under such circumstances, the indicators i_EVS, i_EVA, i_EVB, i_CID, and i_CINT constitute indicators that are standardized in the meaning of that document.

The inventors have observed that the above-mentioned indicators enable mechanical type degradations to be detected in effective and reliable manner. Nevertheless, the invention may also involve the use of other indicators.

In corresponding manner, the set of indicators i_EPA, i_EPB, i_SOMA, i_SOMB, and i_EWRAP serve to detect electrical type degradations of the actuator system 2, e.g. intermittent contacts in the control system for the actuators 21 and 22 via channel A or channel B, and intermittent contacts in the measurement system of the actuator 21 or 22.

More precisely, the values of the indicators i_EPA, i_EPB, i_SOMA, i_SOMB, and i_EWRAP form a matrix, also referred to as a signature matrix, serving to detect and locate such degradations. Several techniques known to the person skilled in the art enable a signature matrix to be associated with a particular degradation. For example, the technique described in document FR 2 939 924 may be used, and under such circumstances, the indicators i_EPA, i_EPB, i_SOMA, i_SOMB, and i_EWRAP constitute indicators that are standardized in the meaning of that document.

The inventors have found that the above-mentioned indicators enable electrical type degradations to be detected in effective and reliable manner. Nevertheless, the invention may also involve the use of other indicators.

Thus, in step E50, the monitoring device 1 may detect degradation relating to the servo-control loop 3 on the basis of symptoms.

In step E60, the monitoring device 1 verifies whether a degradation was detected during step E50.

If a degradation has been detected, then it issues a maintenance notice identifying the degradation and its location (step E70), and recommending maintenance on the servo-control loop (e.g. replacing a component in the actuator system as a function of the detected degradation).

This notice may be sent subsequently to the operator of the aircraft using the communications means 15 of the monitoring device 1.

In contrast, if no degradation is detected, no maintenance notice is issued (step E80) and monitoring continues.

In the implementation described herein, attention is given to monitoring the servo-control loop of a VSV actuator system. As mentioned above, the invention also applies to other actuator systems.

In addition, for such other actuator systems, other parameters, and/or indicators, and/or symptoms, and/or signatures may be envisaged.

For example, for a servo-control loop in a fuel metering system (FMV), consideration may be given to an additional indicator constituted by the difference between a flow rate that has been ordered and a flow rate that is measured.

For a servo-control loop of an actuator system for positioning air pressure VBVs, consideration may be given to an additional indicator constituted by the difference between the position ordered and the position reached. This additional indicator could also be taken into consideration for a servo-control loop of a system for actuating the blade tip clearances of a high-pressure or low-pressure turbine, such as the HPTACC or LPTACC actuator systems.

What is claimed is:

1. A monitoring method for monitoring a servo-control loop (3) of an actuator system (2) for actuating variable-geometry components of a turbojet, the actuator system (2) comprising at least a servovalve (25), and first and second actuators (21, 22), said method comprising:
    an estimation step E20 of estimating a plurality of monitoring parameters m1-m17 from operating data d4-d14 of the servo-control loop (3);
    an evaluation step E30 of evaluating a plurality of indicators i_EVS, i_EVA, i_EVB, i_CID, i_CINT, i_EPA, i_EPB, i_SOMA, i_SOMB, and i_EWRAP from the monitoring parameters;
    an evaluation step E40 for evaluating at least one signature matrix, each signature matrix being representative of the values of at least some of the indicators; and
    a detection and location step E50 of detecting and locating a degradation affecting the servo-control loop as a function of said at least one signature matrix;
    wherein, during the estimation step E20, an estimate is made of a plurality of parameters selected from at least one of the following categories:
    a category of parameters representative of positions VSV1, VSV2, VSVsel of the actuators (21, 22);
    a category of parameters representative of coefficients of autoregressive models used for predicting actuator positions as a function of a control current iCMD of the servovalve (25); and
    a category of parameters representative of the control current iCMD of the servovalve (25) or an integral current of the servo-control loop (3).

2. A monitoring method according to claim 1, wherein at least one of said parameters m4-m7 is estimated from an autoregressive model depending on at least one exogenous variable d1-d3 selected from:
    air pressure of a combustion chamber of the turbojet;
    metered fuel flow rate through at least one injector of the combustion chamber of the turbojet; and
    speed of rotation of a high-pressure shaft of the turbojet.

3. A monitoring method according to claim 1, wherein the category of parameters representative of positions of the actuators (21, 22) comprises at least one of the following parameters:
    a parameter m1 representative of a measured instantaneous position VSV1 of the first actuator (21);
    a parameter m2 representative of a measured instantaneous position VSV2 of the second actuator (22);
    a parameter m6 representative of a predicted position of the first actuator (21);
    a parameter m7 representative of a predicted position of the second actuator (22); and
    a parameter m5 representative of a predicted overall position of the actuator.

4. A monitoring method according to claim 3, wherein the plurality of indicators comprises:
    an indicator i_EVS representing the normalized mean square difference between the parameter m5 representative of the predicted overall position of the actuator and an instantaneous overall position VSVsel of the actuators (21, 22);
    an indicator i_EVA representing the normalized mean square difference between the parameter m1 representative of a measured instantaneous position VSV1 of the first actuator (21) and the parameter m6 representative of a predicted position of the first actuator;
    an indicator i_EVB representing the normalized mean square difference between the parameter m2 representative of a measured instantaneous position VSV2 of the second actuator (22) and the parameter m7 representative of a predicted position of the second actuator;
    an indicator i_CID determined as a function of a parameter m15 representative of the mean control current of the servovalve (25), as normalized by a parameter m14 determined as a function of a reference control current; and
    an indicator i_CINT determined as a function of a parameter m17 representative of the mean integral current of the servo-control loop (3), normalized by a parameter m16 representative of a reference integral current.

5. A monitoring method according to claim 3, wherein the positions of the first and second actuators, respectively, are measured by position sensors comprising secondary windings, the rms voltages across the secondary windings depending on the positions of the actuators, with the plurality of indicators comprising:
    an indicator i_EPA representative of a prediction error for the position of the first actuator (21);
    an indicator i_EPB representative of a prediction error for the position of the second actuator (22);
    an indicator i_SOMA determined as a function of a parameter m9 representing a mean value of the sum of the rms voltages V23_EA and V23_EB of the secondary windings of the position sensors of the first actuator (21), normalized by a parameter m8 representative of a reference mean position for the first actuator (21);
    an indicator i_SOMB determined as a function of a parameter m11 representing a mean value of the sum of the rms voltages V24_EA and V24_EB of the secondary windings of the position sensors of the second actuator (22), normalized by a parameter m10 representative of a reference mean position for the second actuator (22); and
    an indicator i_EWRAP representative of the mean difference m12, m13 existing between the control current iCMD of the servovalve (25) and a return current as actually measured.

6. A monitoring method according to claim 1, wherein the actuator system is a system for actuating variable-geometry components selected from:
- positions of a bleed valve for a turbojet compressor;
- a fuel flow rate; and
- clearances at the blade tips of a high-pressure or low-pressure turbine.

7. A non-transitory recording medium readable by a computer and having recorded thereon a computer program including instructions for executing steps of a monitoring method according to claim 1.

8. A device for monitoring a servo-control loop (3) of an actuator system (2) for actuating variable-geometry components of a turbojet, the actuator system (2) including at least a servovalve (25), and first and second actuators (21, 22), said device comprising:
- estimator means for estimating a plurality of monitoring parameters m1-m17 from operating data d4-d14 of the servo-control loop (3);
- evaluation means for evaluating a plurality of indicators i_EVS, i_EVA, i_EVB, i_CID, i_CINT, i_EPA, i_EPB, i_SOMA, i_SOMB, and i_EWRAP from the monitoring parameters;
- evaluation means for evaluating at least one signature matrix, each signature matrix being representative of the values of at least some of the indicators; and
- detection and location means for detecting and locating a degradation affecting the servo-control loop as a function of said at least one signature matrix;

wherein the estimator means are configured to estimate a plurality of parameters selected from at least one of the following categories:
- a category of parameters representative of positions VSV1, VSV2, VSVsel of the actuators (21, 22);
- a category of parameters representative of coefficients of autoregressive models used for predicting actuator positions as a function of a control current iCMD of the servovalve (25); and
- a category of parameters representative of the control current iCMD of the servovalve (25) or an integral current of the servo-control loop (3).

* * * * *